United States Patent
Aerts et al.

(10) Patent No.: US 8,137,451 B2
(45) Date of Patent: Mar. 20, 2012

(54) BITUMINOUS GLUE

(75) Inventors: Hans Aerts, Lot (BE); Eric Bertrand, Lot (BE); Michel Getlichermann, Lot (BE)

(73) Assignee: S.A. Imperbel N.V., Lot (BE)

( * ) Notice: Subject to any disclaimer, the term of this patent is extended or adjusted under 35 U.S.C. 154(b) by 605 days.

(21) Appl. No.: 12/289,623

(22) Filed: Oct. 30, 2008

(65) Prior Publication Data

US 2009/0173254 A1 Jul. 9, 2009

(30) Foreign Application Priority Data

Oct. 31, 2007 (EP) .................................. 07119808

(51) Int. Cl.
*C09J 195/00* (2006.01)
*C08L 95/00* (2006.01)
*C09D 191/00* (2006.01)
*C09D 195/00* (2006.01)

(52) U.S. Cl. ..................... 106/248; 106/278; 106/281.1; 106/282; 106/283

(58) Field of Classification Search .................. 106/248, 106/278, 281.1, 282, 283
See application file for complete search history.

(56) References Cited

U.S. PATENT DOCUMENTS

| | | | |
|---|---|---|---|
| 2,730,454 A * | 1/1956 | Sommer et al. ............... | 106/669 |
| 6,569,351 B1 | 5/2003 | Baumgardner et al. | |
| 6,569,359 B2 * | 5/2003 | Yukinobu et al. .............. | 252/514 |
| 6,824,326 B2 * | 11/2004 | Raad ................................ | 405/15 |
| 2005/0107488 A1 * | 5/2005 | Yandrasits et al. ............. | 522/156 |
| 2005/0107499 A1 | 5/2005 | Georgeau et al. | |
| 2008/0194738 A1 * | 8/2008 | Crews et al. .................... | 524/60 |
| 2009/0173254 A1 * | 7/2009 | Aerts et al. ..................... | 106/662 |

FOREIGN PATENT DOCUMENTS

| | | |
|---|---|---|
| EP | 1 361 255 | 11/2003 |
| EP | 1 544 254 | 6/2005 |
| EP | 1 674 547 | 6/2006 |
| EP | 2055759 A1 * | 5/2009 |
| GB | 1 404 335 | 8/1975 |
| GB | 2 205 104 | 11/1988 |
| JP | 53-127525 A * | 11/1978 |
| JP | 59-58078 A * | 4/1984 |

OTHER PUBLICATIONS

Derwent-Acc-No. 2009-A81009, abstract of Chinese Patent Specification No. CN 101235209A (Jan. 2008).*

* cited by examiner

*Primary Examiner* — Anthony J Green
(74) *Attorney, Agent, or Firm* — Jacobson Holman PLLC

(57) ABSTRACT

A bituminous glue for cold gluing of construction material and comprising an amount of non-polymerized oil, said glue comprises at least 35% by weight of bitumen, said glue further comprising clay and a dispersing agent, said amount of non-polymerized oil forming between 5 and 30% by weight of said glue and being not mixed with polymerized oil.

21 Claims, No Drawings

BITUMINOUS GLUE

The present invention relates to a bituminous glue for cold gluing of construction material and comprising an amount of non-polymerized oil.

Such a glue is known from the European patent application 1674547. The known glue comprises a combination of a non-polymerized oil forming between 1 and 60% of the glue and a polymerized oil with ethyl-vinyl-acetate copolymer resin (EVA) forming between 1 and 60% of the glue. The known glue further comprises a limited amount of bitumen which forms an additional adhesive. Bituminous glue is used in cold gluing of construction material in particular for its watertight properties. The known glue is thixotropic, which means that it becomes fluid when shaken, stirred or otherwise agitated and sets again to a gel when allowed to stand. The thixotropic properties of the known glue are obtained by the presence of both the polymerized oil in combination with the ethyl-vinyl-acetate copolymer resin (EVA) and the non-polymerized oil in combination with oil absorbing fillers. The use of the combination of these compounds has the advantage that it provides the thixotropic properties without having to use some organic solvents.

A drawback of the known bituminous glue is that the amount of bitumen is limited tot 29% by weight as more bitumen would increase the viscosity making the application of the cold glue rather difficult. The low amount of bitumen substantially limits the watertight properties of the glue.

An object of the invention is to provide a bituminous glue having improved watertight properties without affecting the thixotropic properties of it and without substantially increasing the viscosity.

For this purpose a bituminous glue according to the invention is characterised in that said glue comprises at least 35% by weight of bitumen, said glue further comprising clay and a dispersing agent, said amount of non-polymerized oil forming between 5 and 30% by weight of said glue and being not mixed with polymerized oil.

The amount of at least 35% by weight of bitumen provides to the glue good watertight properties. Although there is at the most 30% by weight of non-polymerized oil, the presence of clay and a dispersing agent in combination with the non-polymerized oil provides appropriate thixotropic properties and an appropriate viscosity to the bituminous glue.

It should be noted that GB-A-2 205 104 describes a cold setting composition formed by two components of which one comprises 40-60% by weight of bitumen mixed with 20-40% fatty acid and the other 10-20% by weight of vegetable oil and sulphur. However, the fact that sulphur is present in one of the components signifies that a polymerized vegetable oil component is present, as the polymerization reaction of the vegetable oil is carried out before addition to the final mixture. In fact, polymers are added to the final mixture. This will adversely affect the thixotropic properties of the composition. Faced with the problem of obtaining a glue with thixotropic properties, the skilled person would not combine EP 1 674 547 with GB-A 2 205 104 as on the one hand the latter document teaches a bitumen mixed with fatty acid, which affects the adhesive properties of the bitumen and on the other hand the presence of sulphur will lead to polymerisation whereas no mixture with polymerized oil is requested. Moreover, both documents teach a two component composition, whereas the present invention relates to a mono-component glue.

A first preferred embodiment of a bituminous glue according to the invention is characterised in that said glue further comprises at the most 10% by weight of a volatile organic compound (VOC) solvent. The presence of such a VOC solvent improves both the thixotropic properties and the viscosity of the glue. As at the most 10% by weight of VOC solvent is present, the amount of VOC solvent remains low, thereby providing still a glue which is environmental friendly.

A second preferred embodiment of a bituminous glue according to the invention is characterised in that said glue further comprises at the most 10% by weight of a non-volatile organic compound solvent. The presence of such a non-VOC solvent improves both the thixotropic properties and the viscosity of the glue. As it is a non-VOC solvent it will not harm the environment.

A third preferred embodiment of a bituminous glue according to the invention is characterised in that said glue further comprises fibres forming between 1 and 3% by weight of said glue. The presence of fibres improves the cohesive character of the glue.

A fourth preferred embodiment of a bituminous glue according to the invention is characterised in that said glue further comprises between 0.1 and 0.4% by weight of clay. The clay improves the thixotropic properties of the glue.

A fifth preferred embodiment of a bituminous glue according to the invention is characterised in that said glue comprises a dispersing agent formed by a tensioactive substance which activates the said clay. The presence of a tensioactive substance improves the thixotropic properties.

A sixth preferred embodiment of a bituminous glue according to the invention is characterised in that said oil is formed by an unsaturated vegetable oil in particular an ester of an unsaturated vegetable oil. The use of such natural compounds offers the advantage to be environment friendly.

Preferably said bitumen has a penetration between 20 and 500 dmm (1/10 mm).

The invention also relates to a use of a solvent-type vegetable oil, and/or an unsaturated vegetable oil, and/or a conjugated or chemically modified vegetable oil, and/or natural functionalized vegetable oil in such a bituminous glue.

The invention will now be described in more details in the description given hereunder.

The bituminous glue according to the present invention is provided for cold gluing of construction material such as bituminous membranes, metal roof sheets, insulation panes, etc . . . . The bituminous glue may comprise a non-Volatile Organic Component (VOC) solvent and/or a volatile organic component solvent. A glue is considered a non VOC glue if the glue has less than 3% by weight of volatile organic components, which is more environmentfriendly than VOC glues. A glue is considered a low VOC glue if the glue contains at the most 10% by weight of volatile organic compounds. Indeed, the volatile components of VOC glues come into the ambient air when the glue is applied, thereby causing air pollution. By limiting the amount of solvent to at the most 10% by weight of the glue, the pollution remains very low. The presence of the VOC and non-VOC solvents contributes to the controlling of the viscosity of the glue.

The bituminous glue according to the present invention comprises between 5% and 30% by weight of a non-polymerized oil and the latter oil is not mixed with polymerized oil. The bituminous glue according to the present invention is thus a mono-component glue as there is no mixing with polymerized oil. In such a manner, the glue according to the present invention distinguishes over the glue disclosed in EP 1 674 547. In the latter document there is taught that in order to provide the glue with thixotropic properties, the oil is preferably composed of:

(1) between 1 and 60% polymerized oil with ethyl-vinyl-acetate copolymer resin (EVA) with respect to the total composition of the glue; and (2) between 1 and 60% non-polymerized oil with oil-adsorbing fillers with respect to the total composition of the glue. There is no teaching in this document to obtain the thixotropic properties in another way than with a combination of a polymerized oil with ethyl-vinyl-acetate copolymer resin (EVA) and a non-polymerized oil with oil-absorbing fillers. The glue according to EP 1 674 547 is not a mono-component glue as there is always one component with polymerized oil and another component with non-polymerized oil.

Moreover, EP 1 674 547 teaches that the amount of bitumen forming an additional adhesive should not be more than 29% by weight of bitumen. According to the present invention, the glue comprises at least 35% by weight of bitumen and preferably between 40 and 60% by weight of bitumen. EP 1 674 547 clearly teaches the skilled person away from using more than 29% by weight of bitumen and from using only a non-polymerized oil.

The amount of at least 35% of bitumen and preferably between 40 and 60% by weight of bitumen offers the advantage to provide good watertight properties to the glue. Moreover, since bitumen has inherent adhesive properties, the presence of the bitumen contributes to the adhesive properties of the glue. The used bitumen preferably has the property of having a penetration of 20 to 500 dmm ($1/10$ mm) when measured by a needle-penetration method.

In order to provide the glue with thixotropic properties, while maintaining a low or non-VOC glue, clay and a dispersing agent are added to the bitumen and the oil. The dispersing agent is preferably formed by a tensioactive substance forming 0.1 to 1% by weight of the glue. The clay forms between 0.1% and 0.4% by weight of the glue, preferably 0.34% by weight of the glue.

The clay is activated by the tensioactive substance. More particularly the clay is dispersed by the tensioactive substance. The combination of the oil, and if present the VOC-solvent and/or non-VOC solvent, with the dispersing agent and the clay provide the glue with thixotropic properties. The solvents, if present, cause the clay to swell, thus providing a gel with good thixotropic properties. A composition comprising such a gel has relative good dispersion stability without sedimentation or separation over a long period. Moreover, such compositions do not require a vigorous shaking to obtain a fluidity of the glue.

The dispersing agent has the physical property that on one side the molecule is charged, whereas it is a-polar on the other side. When dispersed in the clay, the clay particles will be oriented in a same direction due to the shaking or stirring force thereby contributing to the thixotropic property. When the force is no longer applied, the clay particles will orient randomly and the glue returns to rest.

The used oil is preferable formed by a solvent-type vegetable oil and/or an unsaturated vegetable oil and/or a mixture of chemically modified vegetable oils and/or a mixture of natural functionalised vegetable oils and/or conjugated vegetable oils that add specific properties to the bituminous glue.

In a bituminous glue, according to the invention, the oil gives good viscosity properties to the bituminous glue at the moment of application. The viscosity of the bituminous glue is between 10 and 20 Pa·s at 20° C. and a shear rate of 5 s$^{-1}$.

Preferably a solvent-type oil, such as for example short chain vegetable oil, which remain chemically inert upon application of the glue are used. Those oils do not chemically react within the glue but are introduced into the matrix structure of the glue without chemically binding with other molecules. For such solvent-type oils, in particular esters of short chain vegetable oil, more in particular methyl esters can be used. Among vegetable oils, methyl cocoate and methyl laurate form an appropriate choice. The latter oils comprise C8-C12 chains which are chemically inert and provide a low viscosity to the glue.

In another embodiment of the bituminous glue according to the invention, the used oil polymerizes by reaction among unsaturated or conjugated vegetable oils, and/or among different unsaturated vegetable oils, and/or among different conjugated vegetable oils and among unsaturated and conjugated vegetable oils in the presence of oxygen. This also includes chemically modified vegetable oils through oxidation, dimerization and trimerization and naturally functionalised vegetable oils. In particular esters of vegetable oils can be used and more in particular methyl esters of vegetable oils. If necessary drying agents and anti-fouling agents are added to facilitate the polymerization reaction or increase the performance of the bituminous glue. Among vegetable oils, a mixture of linseed methyl ester and tung oil methyl ester forms an appropriate choice.

Preferably, the oil contains at the most 99% by weight of the solvent type oil, and/or 50 to 99% by weight of unsaturated vegetable compounds, and/or at the most 50% by weight of conjugated or chemically modified or naturally functionalised vegetable compounds. The drying agents form at the most 2% by weight of the glue and the anti-fouling agents form at the most 2% by weight of the glue.

It is advantageous when the glue according to the invention also comprises fibres, in particular cellulose fibres, which form between 1 and 3% by weight of the glue. The fibres contribute to the cohesion of the glue and provide it with a more coherent and solid character.

Although the fibres contribute to the thixotropic properties of the glue, their contribution is less than the one of the clay and the dispersing agent.

In the table given hereafter an example of the ingredients of a glue according to the invention is presented. The indicated amounts are given with respect to the total composition of the glue.

| Component | Composition |
|---|---|
| Adhesive | |
| Bitumen 200 dmm | 40-50% |
| VOC Solvent | |
| Aromatic Solvent | 8-10% |
| Oil | |
| Linseed Methyl Ester | 7-10% |
| Rheologic additive | |
| Clay | 1-2% |
| Surfactant | 0.2-0.4% |
| Filler | |
| Filler | 30-35% |
| Reinforcing fibres | |
| Cellulose fibres | 1-2% |

In order to test the performance of the glue a peeling test with a bituminous membrane of 5×30 cm was performed on a concrete support. The peeling test was performed at a speed of 100 mm/min. The results are presented in the table given hereunder and presented as N/5 cm (Newton/5 cm). The surface of the concrete support was first treated with a bituminous primer and dried for minimum 12 hours. The results were obtained after 28 days at room temperature and 28 days at 70° C. The first column presents the separate values and the second column presents the average.

| 28 d RT (N) | 28 d (av) RT (N) | 28 d 70° C. (N) | 28 d (av) 70° C. (N) |
|---|---|---|---|
| 11.13 | 10.25 | 41.26 | 41.01 |
| 9.74 | | 42.61 | |
| 10.44 | | 34.58 | |
| 9.69 | | 45.57 | |

After artificial aging (28 days at 70° C.) the performance of the glue increases spectacularly yielding a high performance glue.

The invention claimed is:

1. A bituminous glue for cold gluing of construction material and comprising, in the absence of polymerized oil, (a) between 5 and 30% by weight of non-polymerized oil, (b) clay, (c) a dispersing agent, and (d) at least 35% by weight of bitumen.

2. The bituminous glue according to claim 1, further comprising a volatile organic compound (VOC) solvent at an amount no more than 10% by weight.

3. The bituminous glue according to claim 1, further comprising a non-volatile organic compound (VOC) solvent at an amount no more than 10% by weight.

4. The bituminous glue according to claim 1, further comprising between 1 and 3% weight of fibres.

5. The bituminous glue according to claim 1, further comprising between 1 and 3% weight of cellulose fibres.

6. The bituminous glue according to claim 1, wherein the dispersing agent is a tensioactive substance.

7. The bituminous glue according to claim 1, wherein the dispersing agent is a tensioactive substance forming 0.1 to 1% by weight of the glue.

8. The bituminous glue according to claim 1, wherein the non-polymerized oil is a vegetable oil.

9. The bituminous glue according to claim 1, wherein the non-polymerized oil is a vegetable oil containing at most 99% by weight of a chemically inert vegetable oil, and/or between 50 and 100% by weight of unsaturated vegetable oil, and/or at most 50% by weight of conjugated or chemically modified or naturally functionalised vegetable oil.

10. The bituminous glue according to claim 1, further comprising a drying agent at an amount no more than 2% by weight and/or an anti-fouling agent at an amount no more than 2% by weight.

11. The bituminous glue according to claim 1, wherein the clay is activated by a tensioactive substance forming between 0.1 and 0.4% by weight of the glue.

12. The bituminous glue according to claim 1, wherein the clay is activated by a tensioactive substance forming 0.34% by weight of the glue.

13. The bituminous glue according to claim 1, wherein the bitumen has a penetration between 20 and 500 dmm (1/10 mm).

14. A process for preparing the bituminous glue of claim 1 comprising combining (a) between 5 and 30% by weight of non-polymerized oil, (b) clay, (c) a dispersing agent, and (d) at least 35% by weight of bitumen.

15. The process according to claim 14, wherein the non-polymerized oil comprises esters of short chain vegetable oils, wherein the esters are methyl esters of an 8-10 carbon chain.

16. The process according to claim 14, wherein the non-polymerized oil is a methyl cocoate and/or methyl laurate oil.

17. The process according to claim 14, wherein the non-polymerized oil is an unsaturated vegetable oil.

18. The process according to claim 14, wherein the non-polymerized oil is a linseed methyl ester oil.

19. The process according to claim 14, wherein the non-polymerized oil comprises esters of conjugated or chemically modified or naturally functionalised vegetable oils.

20. The process according to claim 14, wherein the non-polymerized oil is a tung oil methyl ester or an oxidized methyl ester.

21. A mono-component glue product comprising the bituminous glue according to claim 1.

\* \* \* \* \*